(12) United States Patent
Inoue et al.

(10) Patent No.: US 12,030,481 B2
(45) Date of Patent: Jul. 9, 2024

(54) VEHICLE CONTROL DEVICE

(71) Applicant: HONDA MOTOR CO., LTD., Tokyo (JP)

(72) Inventors: Mamiko Inoue, Tokyo (JP); Yosuke Naito, Tokyo (JP); Hajime Umezu, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 336 days.

(21) Appl. No.: 17/585,100

(22) Filed: Jan. 26, 2022

(65) Prior Publication Data

US 2022/0234569 A1  Jul. 28, 2022

(30) Foreign Application Priority Data

Jan. 28, 2021  (JP) ................................ 2021-012496

(51) Int. Cl.
*B60W 20/20* (2016.01)
*B60K 6/442* (2007.10)
(Continued)

(52) U.S. Cl.
CPC ............. *B60W 20/20* (2013.01); *B60K 6/442* (2013.01); *B60K 6/547* (2013.01); *B60W 10/02* (2013.01);
(Continued)

(58) Field of Classification Search
CPC ............. B60K 6/442; B60K 2006/381; B60K 2006/542; B60K 6/365; B60K 6/387;
(Continued)

(56) References Cited

U.S. PATENT DOCUMENTS 9,457,798 B2 * 10/2016 Futatsudera .......... B60W 10/26
10,011,271 B2 *  7/2018 Takagi .................. B60K 6/442
(Continued)

FOREIGN PATENT DOCUMENTS

CN       1371824 A    10/2002
CN     102009649 A     4/2011
(Continued)

OTHER PUBLICATIONS

Nov. 8, 2022, Japanese Office Action issued for related JP Application No. 2021-012496.
(Continued)

*Primary Examiner* — James A Shriver, II
*Assistant Examiner* — Hilary L Johns
(74) *Attorney, Agent, or Firm* — Paratus Law Group, PLLC (57) ABSTRACT

A vehicle control device is configured to control a vehicle. The vehicle control device is capable of deriving a required driving force required for traveling of the vehicle based on an output requirement received from a driver, and controlling a driving force of the vehicle using the required driving force as a target value. The vehicle control device is configured to transition to a second traveling mode when the required driving force increases while the vehicle is traveling in a first traveling mode. The vehicle control device is configured to perform driving force reduction control, in which an amount of increase in the required driving force accompanying an increase in the output requirement is made smaller than an amount of increase in the required driving force in a normal state, at a time of performing transition to the second traveling mode.

4 Claims, 4 Drawing Sheets (51) Int. Cl.
*B60K 6/547* (2007.10)
*B60W 10/02* (2006.01)
*B60W 10/11* (2012.01)

(52) U.S. Cl.
CPC ....... *B60W 10/11* (2013.01); *B60W 2530/203* (2020.02); *B60Y 2200/92* (2013.01)

(58) Field of Classification Search
CPC .......... B60K 6/445; B60K 6/46; B60K 6/543; B60K 6/547; B60W 10/06; B60W 10/08; B60W 20/00; B60W 20/15; B60W 20/20; B60W 2710/0644; B60W 10/02; B60W 20/40; B60W 2510/0638; B60W 2710/021; B60W 2710/0666; B60W 10/26; B60W 20/17; B60W 2510/081; B60W 2510/244; B60W 2520/10; B60W 2520/105; B60W 10/11; B60W 2540/10; B60W 2710/0616; B60W 2710/0627; B60W 2710/242; B60W 2720/28; B60W 30/1882; B60W 50/14; B60W 2530/203; Y02T 10/62; Y02T 10/64; Y02T 10/70; Y02T 10/7072; Y02T 90/14; F02D 2200/101; F02D 2200/501; F02D 2200/60; F02D 2250/21; F02D 31/001; F02D 41/04; F02D 41/123; Y10S 903/93; Y10S 903/911; Y10S 903/918; B60L 2220/42; B60L 50/15; B60L 50/40; B60L 50/61; B60L 53/22; B60Y 2200/92; B60Y 2300/182; B60Y 2300/42; B60Y 2300/80; F16H 2037/0873; F16H 2200/2007; F16H 2200/2038; F16H 3/728
USPC ....................................................... 180/65.21
See application file for complete search history.

(56) References Cited

U.S. PATENT DOCUMENTS

| | | | | |
|---|---|---|---|---|
| 11,267,455 B2* | 3/2022 | Miki | ....................... | B60W 20/15 |
| 11,827,206 B2* | 11/2023 | Naito | ..................... | F02D 41/123 |
| 2002/0112903 A1 | 8/2002 | Wakashiro et al. | | |
| 2002/0115532 A1 | 8/2002 | Wakashiro et al. | | |
| 2011/0118077 A1 | 5/2011 | Kawasaki et al. | | |
| 2012/0253576 A1 | 10/2012 | Tamagawa | | |
| 2014/0330467 A1 | 11/2014 | Tamagawa | | |
| 2015/0353075 A1* | 12/2015 | Futatsudera | .......... | B60W 20/00 180/65.23 |
| 2016/0347307 A1 | 12/2016 | Banshoya et al. | | |
| 2018/0022342 A1* | 1/2018 | Takagi | ................... | B60K 6/365 180/65.23 |
| 2018/0312050 A1 | 11/2018 | Endo et al. | | |
| 2020/0094812 A1 | 3/2020 | Kurihashi | | |
| 2020/0122712 A1* | 4/2020 | Miki | ..................... | B60W 10/06 |
| 2022/0258717 A1* | 8/2022 | Naito | ................... | F02D 31/001 |

FOREIGN PATENT DOCUMENTS

| | | | |
|---|---|---|---|
| CN | 102666234 | A | 9/2012 |
| CN | 103171559 | A | 6/2013 |
| CN | 103754215 | A | 4/2014 |
| CN | 104918811 | A | 9/2015 |
| CN | 106080585 | A | 11/2016 |
| CN | 106183777 | A | 12/2016 |
| CN | 107207003 | A | 9/2017 |
| CN | 108790772 | A | 11/2018 |
| CN | 109591803 | A | 4/2019 |
| JP | 2009-280082 | A | 12/2009 |
| JP | 2016-150676 | A | 8/2016 |
| JP | 2017-202756 | A | 11/2017 |
| JP | 2018-065524 | A | 4/2018 |
| JP | 2020-083219 | A | 6/2020 |
| JP | 2020-131880 | A | 8/2020 |
| WO | WO 2009/139305 | A1 | 11/2009 |
| WO | WO 2014/109064 | A1 | 7/2014 |
| WO | WO 2019/003443 | A1 | 1/2019 |
| WO | WO 2020/065799 | A1 | 4/2020 |

OTHER PUBLICATIONS

Mar. 13, 2024, Translation of Chinese Office Action issued for related CN Application No. 202111681331.2.

* cited by examiner

| TRAVELING MODE | FIRST CLUTCH | SECOND CLUTCH | ENGINE | MOTOR | GENERATOR |
|---|---|---|---|---|---|
| EV TRAVELING MODE | DISENGAGE | DISENGAGE | STOP POWER OUTPUT | HYBRID DRIVE | STOP POWER GENERATION |
| HYBRID TRAVELING MODE | DISENGAGE | DISENGAGE | OUTPUT POWER | GENERATOR DRIVE | GENERATE POWER |
| LOW-SPEED SIDE ENGINE TRAVELING MODE | ENGAGE | DISENGAGE | OUTPUT POWER | OUTPUT POWER AS NECESSARY | STOP POWER GENERATION |
| HIGH-SPEED SIDE ENGINE TRAVELING MODE | DISENGAGE | ENGAGE | OUTPUT POWER | OUTPUT POWER AS NECESSARY | STOP POWER GENERATION |

VEHICLE CONTROL DEVICE

CROSS-REFERENCE TO RELATED APPLICATIONS

The present application claims the benefit of priority of Japanese Patent Application No. 2021-012496, filed on Jan. 28, 2021, the content of which is incorporated herein by reference.

TECHNICAL FIELD

The present disclosure relates to a vehicle control device.

BACKGROUND ART

In recent years, a hybrid electric vehicle including an internal combustion engine and an electric motor has been developed. There are roughly two types of hybrid electric vehicles, that is, a series type and a parallel type. In a series type hybrid electric vehicle, a generator is driven by an internal combustion engine, the generated electric power is supplied to an electric motor, and drive wheels are driven by the electric motor, thereby causing the vehicle to travel. In a parallel type hybrid electric vehicle, drive wheels are driven by power of at least one of an internal combustion engine and an electric motor, thereby causing the vehicle to travel.

A hybrid electric vehicle capable of switching between a series type and a parallel type is also known. For example, see International publication No. WO2019/003443 (hereinafter referred to as Patent Literature 1). In a hybrid electric vehicle capable of switching between a series type and a parallel type, a power transmission system is switched to any one of a configuration of a series type and a parallel type by disengaging or engaging a clutch (connecting-disconnecting part).

In the related art, a driving force of a vehicle may change suddenly at the time of switching a traveling mode (for example, a power transmission system) of the vehicle, and there is room for improvement in this respect.

If the driving force of the vehicle suddenly changes at the time of switching the traveling mode of the vehicle, a driver may feel uncomfortable due to a sudden change in an acceleration feeling that is caused by the sudden change in the driving force, and the marketability of the vehicle may be impaired.

The present disclosure provides a vehicle control device that, in a vehicle that can take a first traveling mode in which the vehicle travels by power of an internal combustion engine and a second traveling mode in which the vehicle travels by power of an electric motor, enables a transition from the first traveling mode to the second traveling mode while suppressing a sudden change in a driving force of the vehicle.

SUMMARY

A vehicle control device related to a first aspect and configured to control a vehicle, the vehicle including: an internal combustion engine; a generator that is driven by the internal combustion engine; an electric motor configured to perform driving by use of supply of electric power from the generator; a drive wheel that is driven by at least one of the internal combustion engine and the electric motor; and a connecting-disconnecting part configured to connect and disconnect a power transmission path between the internal combustion engine and the drive wheel,
in which the vehicle is capable of traveling in a plurality of traveling modes including
a first traveling mode in which the power transmission path is connected by the connecting-disconnecting part and at least the internal combustion engine drives the drive wheel to cause the vehicle to travel, and
a second traveling mode in which the power transmission path is disconnected by the connecting-disconnecting part and the electric motor drives the drive wheel by use of supply of electric power from at least the generator to cause the vehicle to travel, and
in which the vehicle control device
is capable of deriving a required driving force required for traveling of the vehicle based on an output requirement received from a driver, and controlling a driving force of the vehicle using the required driving force as a target value,
is configured to transition to the second traveling mode when the required driving force increases while the vehicle is traveling in the first traveling mode, and
is configured to perform driving force reduction control, in which an amount of increase in the required driving force accompanying an increase in the output requirement is made smaller than an amount of increase in the required driving force in a normal state, at a time of performing transition to the second traveling mode.

A vehicle control device related to a second aspect and configured to a vehicle, the vehicle including: an internal combustion engine; a generator that is driven by the internal combustion engine; an electric motor configured to perform driving by use of supply of electric power from the generator; a drive wheel that is driven by at least one of the internal combustion engine and the electric motor; and a connecting-disconnecting part configured to connect and disconnect a power transmission path between the internal combustion engine and the drive wheel,
in which the power transmission path includes a first power transmission path on a low speed side and a second power transmission path on a higher speed side than the first power transmission path,
in which the connecting-disconnecting part includes a first connecting-disconnecting part configured to connect and disconnect the first power transmission path, and a second connecting-disconnecting part configured to connect and disconnect the second power transmission path,
in which the vehicle is capable of traveling in a plurality of traveling modes including
a first traveling mode in which the first power transmission path is connected by the first connecting-disconnecting part, the second power transmission path is disconnected by the second connecting-disconnecting part, and at least the internal combustion engine drives the drive wheel via the first power transmission path to cause the vehicle to travel, and
a second traveling mode in which the first power transmission path is disconnected by the first connecting-disconnecting part, the second power transmission path is disconnected by the second connecting-disconnecting part, and the electric motor drives the drive wheel by use of supply of electric power from at least the generator to cause the vehicle to travel, and wherein the vehicle control device
is capable of deriving a required driving force required for traveling of the vehicle based on an output requirement received from a driver, and controlling a driving force of the vehicle using the required driving force as a target value,
is configured to transition to the second traveling mode when the required driving force increases while the vehicle is traveling in the first traveling mode, and
is configured to perform driving force reduction control, in which an amount of increase in the required driving force accompanying an increase in the output requirement is made smaller than an amount of increase in the required driving force in a normal state, at a time of performing transition to the second traveling mode.

According to the present disclosure, a vehicle control device can be provided that, in a vehicle that can take a first traveling mode in which the vehicle travels by power of an internal combustion engine and a second traveling mode in which the vehicle travels by power of an electric motor, enables a transition from the first traveling mode to the second traveling mode while suppressing a sudden change in a driving force of the vehicle.

BRIEF DESCRIPTION OF DRAWINGS

Exemplary embodiments of the present invention will be described in detail based on the following figures, wherein.

DESCRIPTION OF EMBODIMENTS

Hereinafter, an embodiment of a vehicle control device of the present disclosure will be described in detail with reference to the drawings.

Figure 1:
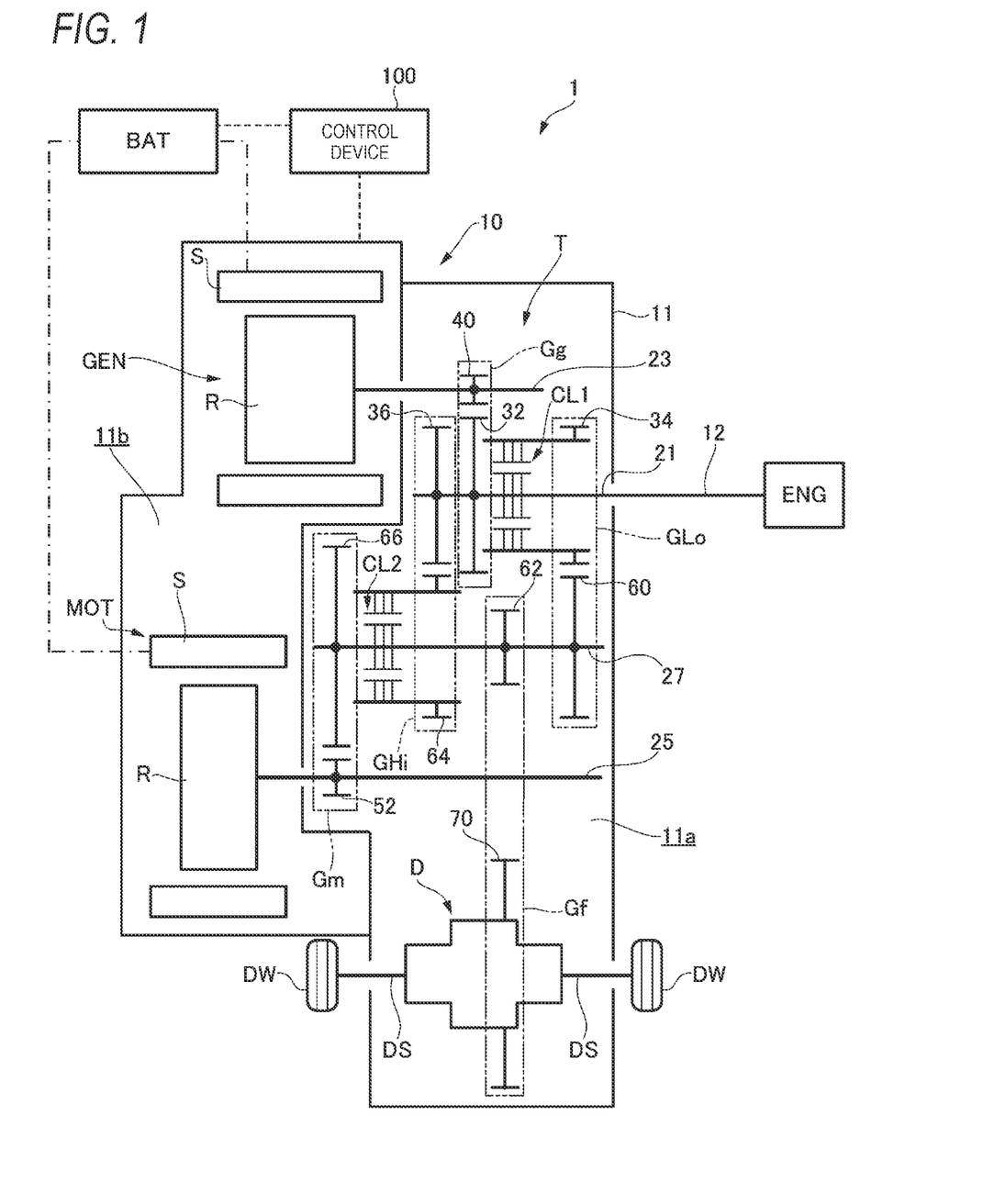
FIG. 1 is a diagram illustrating a schematic configuration of a vehicle including a control device according to an embodiment of the present disclosure.

First, a vehicle 1 including a control device 100 according to an embodiment of a vehicle control device of the present disclosure will be described with reference to FIG. 1. As illustrated in FIG. 1, the vehicle 1 of the present embodiment includes a drive device 10 that outputs a driving force of the vehicle 1, and the control device 100 that performs control of the entire vehicle 1 including the drive device 10.

[Drive Device]

As illustrated in FIG. 1, the drive device 10 includes an engine ENG that is an example of an internal combustion engine according to the present disclosure, a generator GEN that is an example of a generator according to the present disclosure, a motor MOT that is an example of an electric motor according to the present disclosure, a transmission T, and a case 11 that accommodates the generator GEN, the motor MOT, and the transmission T. The motor MOT and the generator GEN are connected to a battery BAT provided in the vehicle 1, and power supply from the battery BAT and energy regeneration to the battery BAT are possible. The battery BAT is an example of a power storage device according to the present disclosure.

[Transmission]

The case 11 is provided with, from an engine ENG side along an axial direction, a transmission accommodation chamber 11a that accommodates the transmission T and a motor accommodation chamber 11b that accommodates the motor MOT and the generator GEN.

The transmission accommodation chamber 11a accommodates an input shaft 21, a generator shaft 23, a motor shaft 25, and a counter shaft 27, which are disposed parallel to one another, and a differential mechanism D.

The input shaft 21 is disposed side by side and coaxially with a crankshaft 12 of the engine ENG. A driving force of the crankshaft 12 is transmitted to the input shaft 21 via a damper (not shown). On the input shaft 21, a generator drive gear 32 constituting a generator gear train Gg is provided.

On the input shaft 21, a low-speed side drive gear 34 constituting a low-speed side engine gear train GLo is provided via a first clutch CL1 on an engine side with respect to the generator drive gear 32, and a high-speed side drive gear 36 constituting a high-speed side engine gear train GHi is provided on a side opposite to the engine side (hereinafter referred to as a motor side). The first clutch CL1 is a hydraulic clutch capable of engaging and disengaging the input shaft 21 with and from the low-speed side drive gear 34, and is a so-called multi-plate friction clutch.

The generator shaft 23 is provided with a generator driven gear 40 that meshes with the generator drive gear 32. The generator drive gear 32 of the input shaft 21 and the generator driven gear 40 of the generator shaft 23 constitute the generator gear train Gg for transmitting rotation of the input shaft 21 to the generator shaft 23. On the motor side of the generator shaft 23, the generator GEN is disposed. The generator GEN is configured to include a rotor R that is fixed to the generator shaft 23, and a stator S that is fixed to the case 11 and disposed on an outer diameter side of the rotor R so as to face the rotor R.

When the rotation of the input shaft 21 is transmitted to the generator shaft 23 via the generator gear train Gg, the rotor R of the generator GEN is rotated by the rotation of the generator shaft 23. Thus, at the time of driving of the engine ENG, power of the engine ENG input from the input shaft 21 can be converted into electric power by the generator GEN.

The motor shaft 25 is provided with a motor drive gear 52 constituting a motor gear train Gm. On the motor shaft 25, the motor MOT is disposed on the motor side with respect to the motor drive gear 52. The motor MOT includes a rotor R that is fixed to the motor shaft 25, and a stator S that is fixed to the case 11 and disposed on an outer diameter side of the rotor R so as to face the rotor R.

The counter shaft 27 is provided with, in an order from the engine side, a low-speed side driven gear 60 that meshes with the low-speed side drive gear 34, an output gear 62 that meshes with a ring gear 70 of the differential mechanism D, a high-speed side driven gear 64 that meshes with the high-speed side drive gear 36 of the input shaft 21 via a second clutch CL2, and a motor driven gear 66 that meshes with the motor drive gear 52 of the motor shaft 25. The second clutch CL2 is a hydraulic clutch capable of engaging and disengaging the counter shaft 27 with and from the high-speed side driven gear 64, and is a so-called multi-plate friction clutch.

The low-speed side drive gear 34 of the input shaft 21 and the low-speed side driven gear 60 of the counter shaft 27 constitute the low-speed side engine gear train GLo for transmitting the rotation of the input shaft 21 to the counter shaft 27. The high-speed side drive gear 36 of the input shaft 21 and the high-speed side driven gear 64 of the counter shaft 27 constitute the high-speed side engine gear train GHi for transmitting the rotation of the input shaft 21 to the counter shaft 27. Here, the low-speed side engine gear train GLo including the low-speed side drive gear 34 and the low-speed side driven gear 60 has a larger reduction ratio than the high-speed side engine gear train GHi including the high-speed side drive gear 36 and the high-speed side driven gear 64.

Accordingly, when the first clutch CL1 is engaged and the second clutch CL2 is disengaged at the time of driving of the engine ENG, a driving force of the engine ENG is transmitted to the counter shaft 27 via the low-speed side engine gear train GLo at a large reduction ratio. On the other hand, when the first clutch CL1 is disengaged and the second clutch CL2 is engaged at the time of driving of the engine ENG, the driving force of the engine ENG is transmitted to the counter shaft 27 via the high-speed side engine gear train GHi at a small reduction ratio. Note that there is no occurrence that the first clutch CL1 and the second clutch CL2 are engaged at the same time.

The motor drive gear 52 of the motor shaft 25 and the motor driven gear 66 of the counter shaft 27 constitute the motor gear train Gm for transmitting rotation of the motor shaft 25 to the counter shaft 27. When the rotor R of the motor MOT is rotated, the rotation of the motor shaft 25 is transmitted to the counter shaft 27 via the motor gear train Gm. Accordingly, at the time of driving of the motor MOT, a driving force of the motor MOT is transmitted to the counter shaft 27 via the motor gear train Gm.

The output gear 62 of the counter shaft 27 and the ring gear 70 of the differential mechanism D constitute a final gear train Gf for transmitting rotation of the counter shaft 27 to the differential mechanism D. Accordingly, the driving force of the motor MOT input to the counter shaft 27 via the motor gear train Gm, the driving force of the engine ENG input to the counter shaft 27 via the low-speed side engine gear train GLo, and the driving force of the engine ENG input to the counter shaft 27 via the high-speed side engine gear train GHi are transmitted to the differential mechanism D via the final gear train Gf and transmitted from the differential mechanism D to an axle DS. As a result, a driving force for causing the vehicle 1 to travel is output via a pair of drive wheels DW provided at both ends of the axle DS.

The drive device 10 configured as described above has a power transmission path for transmitting the driving force of the motor MOT to the axle DS (that is, the drive wheels DW), a low-speed side power transmission path for transmitting the driving force of the engine ENG to the axle DS, and a high-speed side power transmission path for transmitting the driving force of the engine ENG to the axle DS. Thus, as will be described later, the vehicle 1 equipped with the drive device 10 can take a plurality of traveling modes such as an EV traveling mode or a hybrid traveling mode in which the vehicle travels by power output from the motor MOT, and a low-speed side engine traveling mode or a high-speed side engine traveling mode in which the vehicle travels by power output from the engine ENG.

The control device 100 acquires vehicle information related to the vehicle 1 based on detection signals received from various sensors provided in the vehicle 1, and controls the drive device 10 based on the acquired vehicle information. Examples of the sensors provided in the vehicle 1 include a vehicle speed sensor that detects a rotation speed of the axle DS, an accelerator position sensor (hereinafter, also referred to as an AP sensor) that detects an operation amount with respect to an accelerator pedal of the vehicle 1, a brake sensor that detects an operation amount with respect to a brake pedal of the vehicle 1, an engine rotation speed sensor that detects a rotation speed of the engine ENG (hereinafter, also referred to as an engine rotation speed), and a battery sensor that detects a state of the battery BAT (for example, a voltage between terminals, a charging/discharging current, and a temperature of the battery BAT).

The vehicle information includes information indicating a traveling state of the vehicle 1. Examples of the traveling state of the vehicle 1 include a speed of the vehicle 1 (hereinafter, also referred to as a vehicle speed), an AP opening degree (that is, an accelerator position) indicating an operation amount with respect to the accelerator pedal provided in the vehicle 1, a driving force required for traveling of the vehicle 1 (hereinafter, also referred to as a required driving force), and an engine rotation speed. The AP opening degree is an example of an output requirement received from a driver.

The vehicle speed can be acquired based on a detection signal from the vehicle speed sensor. The AP opening degree can be acquired based on a detection signal from the AP sensor. The engine rotation speed can be acquired based on a detection signal from the engine rotation speed sensor. The required driving force can be derived based on the vehicle speed, the AP opening degree (that is, the output requirement), and the like.

The vehicle information further includes battery information related to the battery BAT provided in the vehicle 1. The battery information includes information indicating a state of charge (SOC) that is a remaining capacity of the battery BAT. The SOC of the battery BAT is hereinafter also referred to as a battery SOC. The battery SOC can be derived based on a detection signal (for example, a voltage between terminals or a charging/discharging current of the battery BAT) from the battery sensor. In addition, the battery information may include information such as a voltage between terminals, a charging/discharging current, and a temperature of the battery BAT detected by the battery sensor.

The control device 100 controls the drive device 10 based on the vehicle information (that is, the traveling state of the vehicle 1 and the battery information). Specifically, the control device 100 controls the driving force of the vehicle 1 (that is, the output of the drive device 10) by using the required driving force derived based on the vehicle speed and the AP opening degree (that is, the output requirement received from the driver) as a target value.

The control device 100 controls the drive device 10 based on the vehicle information (that is, the traveling state of the vehicle 1 and the battery information) to cause the vehicle 1 to travel in one of the plurality of traveling modes (to be described later) that the vehicle 1 can take. In controlling the drive device 10, for example, the control device 100 controls the driving of the engine ENG by controlling supply of fuel to the engine ENG, controls the driving of the motor MOT by controlling supply of electric power from the generator GEN or the battery BAT to the motor MOT, and controls power generation of the generator GEN by controlling a field current or the like flowing through coils of the generator GEN.

Further, in controlling the drive device 10, the control device 100 controls an actuator (not shown), which operates the first clutch CL1, to engage or disengage the first clutch CL1. Similarly, the control device 100 controls an actuator (not shown), which operates the second clutch CL2, to engage or disengage the second clutch CL2.

In this way, the control device 100 controls the engine ENG, the generator GEN, the motor MOT, the first clutch CL1, and the second clutch CL2, thereby enabling the vehicle 1 to travel in any one of the plurality of traveling modes to be described later. Note that the control device 100 is implemented with, for example, an electronic control unit (ECU) that includes a processor, a memory, an interface, and the like.

[Traveling Modes that Vehicle can Take]

Figure 2:
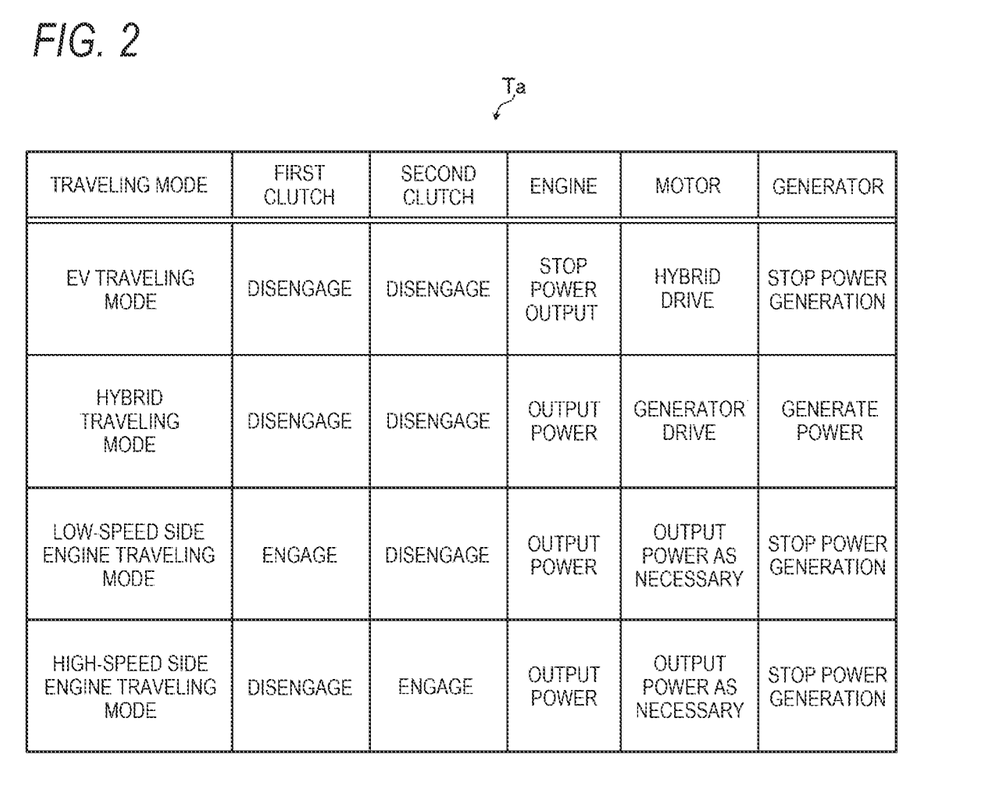
FIG. 2 is a table illustrating contents of traveling modes.

Next, traveling modes that can be taken by the vehicle 1 will be described with reference to a traveling mode table Ta illustrated in FIG. 2. As illustrated in FIG. 2, the vehicle 1 can take an EV traveling mode, a hybrid traveling mode, a low-speed side engine traveling mode, and a high-speed side engine traveling mode.

[EV Traveling Mode]

The EV traveling mode is a traveling mode in which electric power is supplied from the battery BAT to the motor MOT and the vehicle 1 is caused to travel by power output from the motor MOT by use of the electric power.

Specifically, in the case of the EV traveling mode, the control device 100 disengages both the first clutch CL1 and the second clutch CL2. In addition, in the case of the EV traveling mode, the control device 100 stops fuel injection to the engine ENG to stop the output of the power from the engine ENG. Further, in the case of the EV traveling mode, the control device 100 supplies electric power from the battery BAT to the motor MOT, and causes the motor MOT to output power corresponding to the electric power (illustrated as "battery drive" of motor). Thus, in the EV traveling mode, the vehicle 1 travels by the power output from the motor MOT by use of the electric power supplied from the battery BAT.

In the EV traveling mode, as described above, output of power from the engine ENG is stopped, and both the first clutch CL1 and the second clutch CL2 are disengaged. Accordingly, in the EV traveling mode, power is not input to the generator GEN, and power generation by the generator GEN is not performed (illustrated as "stop power generation" of generator).

[Hybrid Traveling Mode]

The hybrid traveling mode is a traveling mode in which electric power is supplied from at least the generator GEN to the motor MOT, and the vehicle 1 is caused to travel by power output from the motor MOT by use of the electric power. The hybrid traveling mode is an example of a second traveling mode according to the present disclosure.

Specifically, in the case of the hybrid traveling mode, the control device 100 disengages both the first clutch CL1 and the second clutch CL2. In addition, in the case of the hybrid traveling mode, the control device 100 performs fuel injection to the engine ENG to output power from the engine ENG. The power output from the engine ENG is input to the generator GEN via the generator gear train Gg. Accordingly, power generation by the generator GEN is performed.

Further, in the case of the hybrid traveling mode, the control device 100 supplies electric power generated by the generator GEN to the motor MOT, and causes the motor MOT to output power corresponding to the electric power (illustrated as "generator drive" of motor). The electric power supplied from the generator GEN to the motor MOT is larger than the electric power supplied from the battery BAT to the motor MOT. Accordingly, in the hybrid traveling mode, the power output from the motor MOT (the driving force of the motor MOT) can be increased as compared with that in the EV traveling mode, and a large driving force can be obtained as the driving force of the vehicle 1.

In the case of the hybrid traveling mode, the control device 100 can also supply the electric power from the battery BAT to the motor MOT as necessary. That is, the control device 100 can supply electric power to the motor MOT from both the generator GEN and the battery BAT in the hybrid traveling mode. Accordingly, since the electric power supplied to the motor MOT can be increased as compared with that in the case where the electric power is supplied to the motor MOT only by the generator GEN, the power output from the motor MOT can be further increased, and a larger driving force can be obtained as the driving force of the vehicle 1.

[Low-Speed Side Engine Traveling Mode]

The low-speed side engine traveling mode is a traveling mode in which the vehicle 1 is caused to travel by transmitting power output from the engine ENG to the drive wheels DW through the low-speed side power transmission path. The low-speed side engine traveling mode is an example of a first traveling mode according to the present disclosure.

Specifically, in the case of the low-speed side engine traveling mode, the control device 100 performs fuel injection to the engine ENG to output power from the engine ENG. In addition, in the case of the low-speed side engine traveling mode, the control device 100 engages the first clutch CL1 and disengages the second clutch CL2. Accordingly, in the low-speed side engine traveling mode, the power output from the engine ENG is transmitted to the drive wheels DW via the low-speed side engine gear train GLo, the final gear train Gf, and the differential mechanism D to cause the vehicle 1 to travel.

In addition, in the case of the low-speed side engine traveling mode, the power output from the engine ENG is also input to the generator GEN via the generator gear train Gg, but power generation by the generator GEN is controlled so as not to be performed. For example, in the low-speed side engine traveling mode, a switching element provided in an electric-power transmission path between the generator GEN and the battery BAT (for example, a switching element of an inverter device provided between the generator GEN and the battery BAT) is turned off, so that the power generation by the generator GEN is controlled so as not to be performed. Accordingly, in the low-speed side engine traveling mode, it is possible to reduce a loss caused by the generator GEN performing power generation, and to reduce an amount of heat generated by the generator GEN and the like. In addition, in the low-speed side engine traveling mode, when the vehicle 1 is braked, regenerative power generation may be performed by the motor MOT, and the battery BAT may be charged with the generated electric power.

In addition, in the case of the low-speed side engine traveling mode, the control device 100 can supply electric power from the battery BAT to the motor MOT as necessary. Accordingly, in the low-speed side engine traveling mode, the vehicle 1 can be caused to travel also using the power output from the motor MOT based on the electric power supplied from the battery BAT, and a larger driving force can be obtained as the driving force of the vehicle 1 as compared with that in a case where the vehicle 1 is caused to travel only by the power of the engine ENG.

[High-Speed Side Engine Traveling Mode]

The high-speed side engine traveling mode is a traveling mode in which the vehicle 1 is caused to travel by transmitting power output from the engine ENG to the drive wheels DW through the high-speed side power transmission path.

Specifically, in the case of the high-speed side engine traveling mode, the control device 100 performs fuel injection to the engine ENG to output power from the engine ENG. In addition, in the case of the high-speed side engine traveling mode, the control device 100 engages the second clutch CL2 and disengages the first clutch CL1. Accordingly, in the high-speed side engine traveling mode, the power output from the engine ENG is transmitted to the drive wheels DW via the high-speed side engine gear train GHi, the final gear train Gf, and the differential mechanism D to cause the vehicle 1 to travel.

In addition, in the case of the high-speed side engine traveling mode, the power output from the engine ENG is also input to the generator GEN via the generator gear train Gg, but power generation by the generator GEN is controlled so as not to be performed. Accordingly, in the high-speed side engine traveling mode, it is possible to reduce a loss caused by the generator GEN performing power generation, and to reduce an amount of heat generated by the generator GEN and the like. In addition, in the high-speed side engine traveling mode, when the vehicle 1 is braked, regenerative power generation may be performed by the motor MOT, and the battery BAT may be charged with the generated electric power.

In addition, in the high-speed side engine traveling mode, the control device 100 can supply electric power from the battery BAT to the motor MOT as necessary. Accordingly, in the high-speed side engine traveling mode, the vehicle 1 can be caused to travel also using the power output from the motor MOT based on the electric power supplied from the battery BAT, and a larger driving force can be obtained as the driving force of the vehicle 1 as compared with that in the case where the vehicle 1 is caused to travel only by the power of the engine ENG.

[Example of Transition from Low-Speed Side Engine Traveling Mode to Hybrid Traveling Mode]

Here, an example of transition from the low-speed side engine traveling mode to the hybrid traveling mode will be described. In the vehicle 1, a maximum driving force in the hybrid traveling mode (an upper-limit value of the driving force of the vehicle 1) is larger than a maximum driving force in the low-speed side engine traveling mode. On the other hand, in the low-speed side engine traveling mode, the power of the engine ENG is used as it is as the power for causing the vehicle 1 to travel, and thus the power of the engine ENG can be efficiently used with a low loss as compared with the hybrid traveling mode in which the power of the engine ENG is converted into electric power by the generator GEN and used for the traveling of the vehicle 1.

In view of the characteristics of the hybrid traveling mode and the low-speed side engine traveling mode, for example, the control device 100 causes the vehicle 1 to travel in the low-speed side engine traveling mode when the required driving force is lower than a predetermined threshold (where the threshold 5 the maximum driving force in the low-speed engine traveling mode), and causes the vehicle 1 to transition to the hybrid traveling mode when the required driving force exceeds the threshold. Accordingly, the control device 100 can secure the driving force of the vehicle 1 to cause the vehicle 1 to travel smoothly while improving the fuel efficiency of the vehicle 1.

In general, when it is transitioned to the hybrid traveling mode, it is necessary to increase the engine rotation speed more than in the low-speed side engine traveling mode from the viewpoint of securing the driving force of the vehicle 1. In other words, since output of the generator GEN depending on the engine rotation speed cannot be secured until the engine rotation speed completely reaches a rotation speed corresponding to the hybrid traveling mode, sufficient electric power (electric power with which the driving force of the vehicle 1 similar to that before the transition to the hybrid traveling mode can be secured) cannot be supplied to the motor MOT only by the generator GEN.

For this reason, the driving force of the vehicle 1 may decrease at the time of transition from the low-speed side engine traveling mode to the hybrid traveling mode, and when the driving force of the vehicle 1 drops suddenly at this time, the driver may feel uncomfortable due to a sudden change in an acceleration feeling that is caused by the sudden drop in the driving force, and the marketability of the vehicle may be impaired.

Therefore, the control device 100 performs driving force reduction control to be described below when performing the transition to the hybrid traveling mode in order to enable the transition to the hybrid traveling mode while suppressing a sudden change (here, a sudden drop) in the driving force of the vehicle 1.

[Driving Force Reduction Control]

Figure 3:
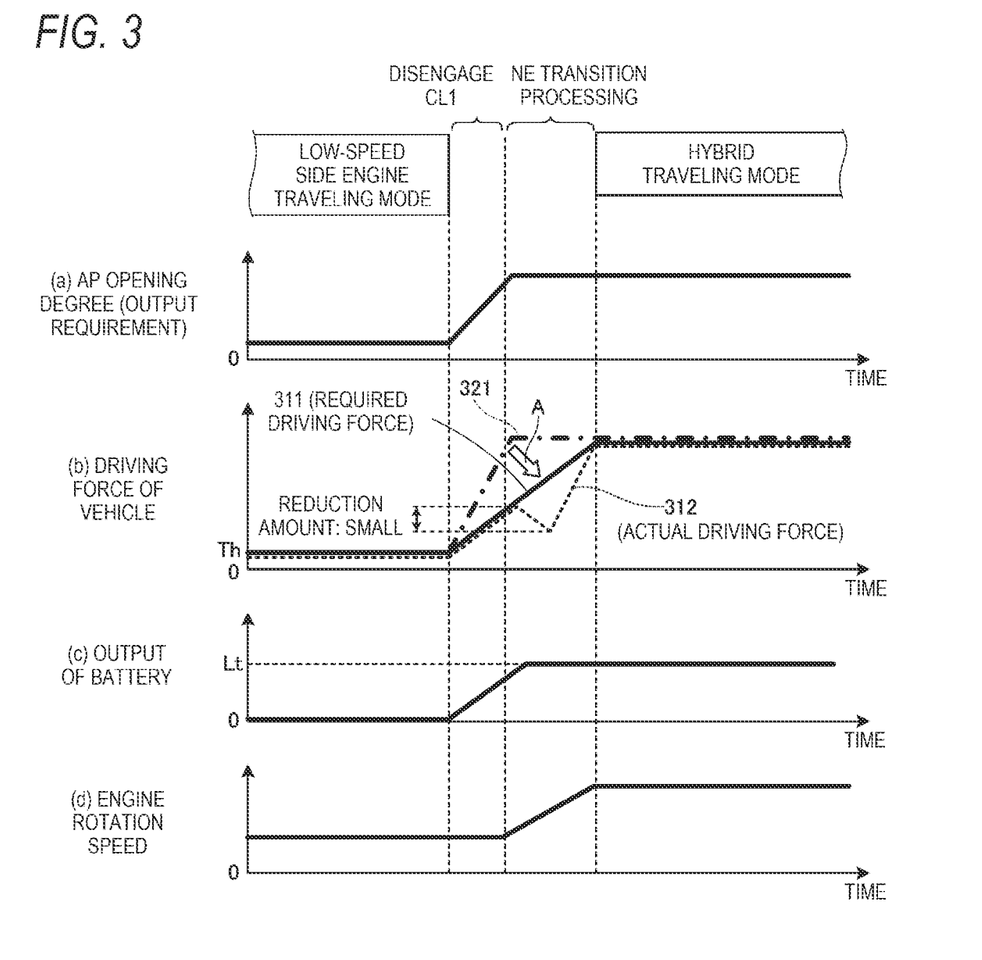
FIG. 3 is a timing chart illustrating an example of a required driving force in a case where driving force reduction control is performed.
Figure 4:
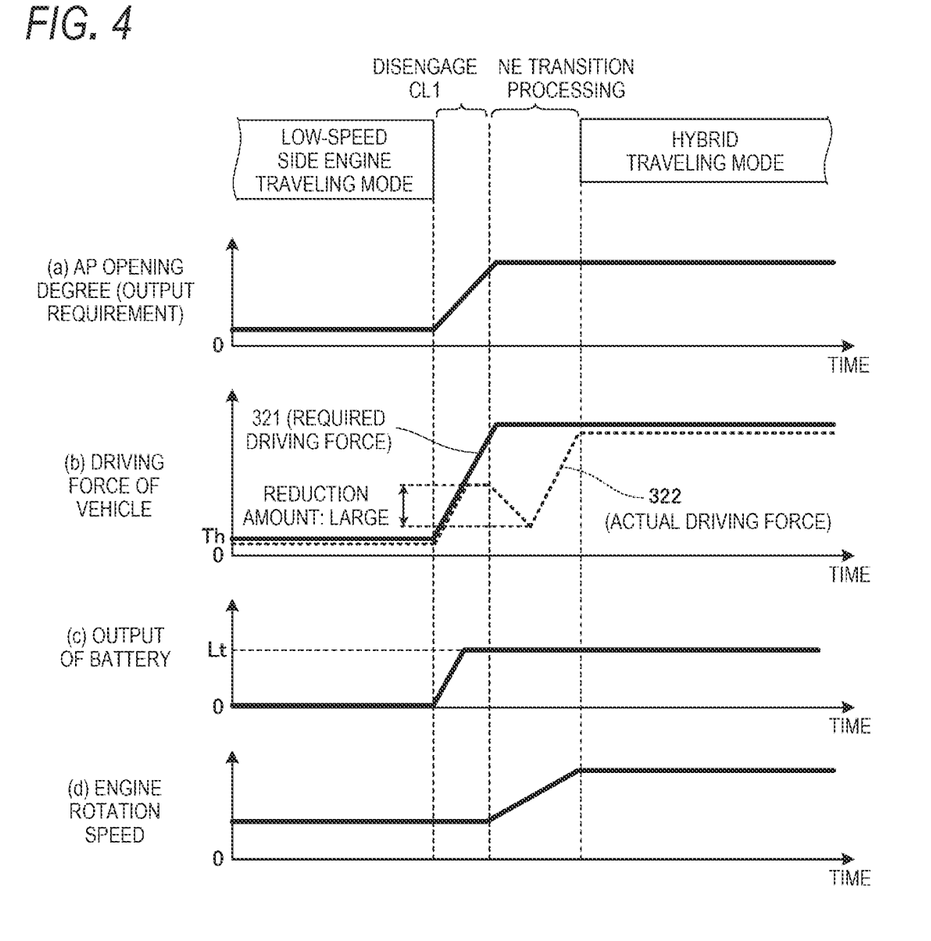
FIG. 4 is a timing chart illustrating an example of a required driving force in a case where driving force reduction control is not performed.

FIGS. 3 and 4 illustrate examples of a required driving force derived in a case where the driving force reduction control is performed by the control device 100 and a required driving force derived in a case where the driving force reduction control is not performed by the control device 100 (that is, in a normal state). In FIG. 3, a reference sign 311 denotes an example of the required driving force in the case where the driving force reduction control is performed, and a reference sign 312 denotes a driving force (illustrated as an actual driving force) of the vehicle 1 that is achieved in a case where a target value is set to the required driving force 311. In FIG. 3 or 4, a reference sign 321 denotes an example of the required driving force in the case where the driving force reduction control is not performed (that is, in a normal state), and a reference sign 322 denotes a driving force (illustrated as an actual driving force) of the vehicle 1 that is achieved in a case where a target value is set to the required driving force 321.

As illustrated in FIGS. 3 and 4, when the AP opening degree is increased and the required driving force exceeds a predetermined threshold Th while the vehicle 1 is traveling in the low-speed side engine traveling mode, the control device 100 disconnects the first clutch CL1 (illustrated as "disengage CL1"), and then performs NE transition processing for increasing the engine rotation speed to a rotation speed corresponding to the hybrid traveling mode, thereby performing the transition to the hybrid traveling mode.

At the time of performing the transition to the hybrid traveling mode, the control device 100 performs the driving force reduction control in which an amount of increase in the required driving force accompanying the increase in the AP opening degree is made smaller than that in the normal state, as indicated by an arrow denoted by a reference sign A in FIG. 3. For example, in order to transition to the hybrid traveling mode, the control device 100 performs the driving force reduction control from a timing at which disengagement of the first clutch CL1 is started to a timing at which the engine rotation speed is completely increased to a rotation speed corresponding to the hybrid traveling mode.

By performing such a driving force reduction control, the control device 100 can suppress an occurrence that the required driving force increases rapidly accompanying the increase in the AP opening degree (that is, an output requirement from the driver) at the time of performing the transition to the hybrid traveling mode, and smoothly increase the driving force of the vehicle 1. Therefore, the control device 100 can perform transition from the low-speed side engine traveling mode to the hybrid traveling mode while suppressing a sudden change in the driving force of the vehicle 1.

That is, as described above, the output of the generator GEN depending on the engine rotation speed cannot be secured until the engine rotation speed completely reaches a rotation speed corresponding to the hybrid traveling mode. Therefore, the greater the driving force of the vehicle 1 at the time when the first clutch CL1 is to be disengaged is, the greater the amount of decrease in the driving force of the vehicle 1 at the time when the first clutch CL1 is disengaged (that is, before the engine rotation speed is increased) is.

By performing the driving force reduction control, the control device 100 can reduce an increasing rate of the driving force of the vehicle 1 at the time when the first clutch CL1 is disengaged, as compared with the case where the driving force reduction control is not performed, and therefore, the amount of decrease in the driving force of the vehicle 1 at the time when the first clutch CL1 is disengaged can be reduced accordingly. Accordingly, the control device 100 can suppress a decrease in the driving force of the vehicle 1 at the time of transition to the hybrid traveling mode.

Further, as described above, since the output of the generator GEN cannot be secured until the engine rotation speed is completely increased, the control device 100 supplies, for example, the electric power of the battery BAT to the motor MOT. As illustrated in FIG. 4, if the driving force of the vehicle 1 is controlled with the required driving force 321, which is the same as that in the normal state, as the target value even at the time of performing the transition to the hybrid traveling mode, an output of the battery BAT reaches Lt, which is an upper-limit output of the battery BAT, before the start of the increase in the engine rotation speed.

On the other hand, by performing the driving force reduction control, the control device 100 can delay the output of the battery BAT reaching the upper-limit output Lt until the first clutch CL1 is disconnected, as illustrated in FIG. 3. That is, the control device 100 can provide a margin to the output of the battery BAT at the time when the first clutch CL1 is disconnected, and can increase the output of the battery BAT even after the first clutch CL1 is disconnected. Accordingly, the control device 100 can use the power output from the motor MOT based on power supply from the battery BAT to compensate for the power of the engine ENG that is not transmitted to the drive wheels DW due to the disconnection of the first clutch CL1, and can suppress a decrease in the driving force of the vehicle 1 at the time of transition to the hybrid traveling mode.

Note that when the vehicle 1 is towing a heavy object and transition from the low-speed side engine traveling mode to the hybrid traveling mode is to be performed, the control device 100 may perform the driving force reduction control. In this case, for example, when a predetermined towing mode setting switch provided in the vehicle 1 is operated by the driver, the control device 100 sets to a towing mode suitable for causing the vehicle 1 to tow the heavy object. Further, in the situation where the towing mode is set, the control device 100 performs the driving force reduction control at the time of performing the transition from the low-speed side engine traveling mode to the hybrid traveling mode. Accordingly, the control device 100 can effectively suppress a sudden drop in the driving force of the vehicle 1 in a situation where a large driving force is required for the vehicle 1.

As described above, the control device 100 performs the driving force reduction control at the time of performing the transition from the low-speed side engine traveling mode, in which the engine ENG drives the drive wheels DW via the low-speed side power transmission path to cause the vehicle 1 to travel, to the hybrid traveling mode, and thus can effectively suppress a sudden drop in the driving force of the vehicle 1.

The driving force reduction control can be implemented, for example, by making a calculation formula, which is used by the control device 100 for deriving the required driving force, different from that in the normal state. In addition, the driving force reduction control may be implemented by making a map, which is referred to by the control device 100 for deriving the required driving force, different from that in the normal state. The calculation formula and the map for deriving the required driving force are prepared in advance by, for example, a manufacturer of the vehicle 1, and are stored in advance in the memory or the like of the control device 100.

As described above, according to the control device 100 of the present embodiment, it is possible to perform transition from the low-speed side engine traveling mode in which the vehicle 1 travels by the power of the engine ENG to the hybrid traveling mode in which the vehicle 1 travels by the power of the motor MOT while suppressing a sudden change in the driving force of the vehicle 1.

The present disclosure is not limited to the embodiment described above, and modifications, improvements, or the like can be made as appropriate.

For example, in the above-described embodiment, two traveling modes of the low-speed side engine traveling mode and the high-speed side engine traveling mode are provided as the traveling modes in which the power of the engine ENG is transmitted to the drive wheels DW to cause the vehicle 1 to travel, but the present disclosure is not limited thereto. For example, only the low-speed side power transmission path may be provided so that only the low-speed side engine traveling mode can be taken as the traveling mode in which the power of the engine ENG is transmitted to the drive wheels DW to cause the vehicle 1 to travel.

Although the driving force reduction control is performed at the time of performing the transition from the low-speed side engine traveling mode to the hybrid traveling mode in the above-described embodiment, the present disclosure is not limited thereto. For example, the driving force reduction control may also be performed at the time of performing transition from the high-speed side engine traveling mode to the hybrid traveling mode. In addition, the driving force reduction control may be performed at the time of performing the transition from the low-speed side engine traveling mode to the hybrid traveling mode, and the driving force reduction control may not be performed at the time of performing the transition from the high-speed side engine traveling mode to the hybrid traveling mode.

In the present specification, at least the following matters are described. Although corresponding components and the like in the above-described embodiment are shown in parentheses, the present disclosure is not limited thereto.

(1) A vehicle control device (control device 100) configured to control a vehicle (vehicle 1), the vehicle including: an internal combustion engine (engine ENG); a generator (generator GEN) that is driven by the internal combustion engine; an electric motor (motor MOT) configured to perform driving by use of supply of electric power from the generator; a drive wheel (drive wheels DW) that is driven by at least one of the internal combustion engine and the electric motor; and a connecting-disconnecting part (first clutch CL1, second clutch CL2) that connects/disconnects a power transmission path between the internal combustion engine and the drive wheel, in which the vehicle is capable of traveling in a plurality of traveling modes including a first traveling mode in which the power transmission path is connected by the connecting-disconnecting part and at least the internal combustion engine drives the drive wheel to cause the vehicle to travel, and a second traveling mode in which the power transmission path is disconnected by the connecting-disconnecting part and the electric motor drives the drive wheel by use of supply of electric power from at least the generator to cause the vehicle to travel, and in which the vehicle control device is capable of deriving a required driving force required for traveling of the vehicle based on an output requirement received from a driver, and controlling a driving force of the vehicle using the required driving force as a target value, is configured to transition to the second traveling mode when the required driving force increases while the vehicle is traveling in the first traveling mode, and is configured to perform driving force reduction control, in which an amount of increase in the required driving force accompanying an increase in the output requirement is made smaller than an amount of increase in the required driving force in a normal state, at a time of performing transition to the second traveling mode.

According to (1), at the time of performing the transition from the first traveling mode to the second traveling mode, the driving force reduction control is performed in which the amount of increase in the required driving force accompanying the increase in the output requirement is made smaller than that in the normal state, and thus the transition from the first traveling mode to the second traveling mode can be performed while suppressing a sudden change in the driving force of the vehicle.

(2) A vehicle control device (control device 100) configured to control a vehicle (vehicle 1), the vehicle including: an internal combustion engine (engine ENG); a generator (generator GEN) that is driven by the internal combustion engine; an electric motor (motor MOT) configured to perform driving by use of supply of electric power from the generator; a drive wheel (drive wheels DW) that is driven by at least one of the internal combustion engine and the electric motor; and a connecting-disconnecting part (first clutch CL1, second clutch CL2) configured to connect and disconnect a power transmission path between the internal combustion engine and the drive wheel, in which the power transmission path includes a first power transmission path on a low speed side and a second power transmission path on a higher speed side than the first power transmission path, in which the connecting-disconnecting part includes a first connecting-disconnecting part (first clutch CL1) configured to connect and disconnect the first power transmission path, and a second connecting-disconnecting part (second clutch CL2) configured to connect and disconnect the second power transmission path, in which the vehicle is capable of traveling in a plurality of traveling modes including a first traveling mode in which the first power transmission path is connected by the first connecting-disconnecting part, the second power transmission path is disconnected by the second connecting-disconnecting part, and at least the internal combustion engine drives the drive wheel via the first power transmission path to cause the vehicle to travel, and a second traveling mode in which the first power transmission path is disconnected by the first connecting-disconnecting part, the second power transmission path is disconnected by the second connecting-disconnecting part, and the electric motor drives the drive wheel by use of supply of electric power from at least the generator to cause the vehicle to travel, and in which the vehicle control device is capable of deriving a required driving force required for traveling of the vehicle based on an output requirement received from a driver, and controlling a driving force of the vehicle using the required driving force as a target value, is configured to transition to the second traveling mode when the required driving force increases while the vehicle is traveling in the first traveling mode, and is configured to perform driving force reduction control, in which an amount of increase in the required driving force accompanying an increase in the output requirement is made smaller than an amount of increase in the required driving force in a normal state, at a time of performing transition to the second traveling mode.

According to (2), at the time of performing the transition from the first traveling mode to the second traveling mode, the driving force reduction control is performed in which the amount of increase in the required driving force accompanying the increase in the output requirement is made smaller than that in the normal state, and thus the transition from the first traveling mode to the second traveling mode can be performed while suppressing a sudden change in the driving force of the vehicle. In addition, the driving force reduction control is performed at the time of performing the transition from the first traveling mode, in which the internal combustion engine drives the drive wheel via the first power transmission path on the low speed side to cause the vehicle to travel, to the second traveling mode, and thus it is possible to effectively suppress a sudden drop in the driving force of the vehicle in a situation where a large driving force is required for the vehicle.

(3) The vehicle control device according to (0) or (2), in which when the vehicle is towing a heavy object and transition to the second traveling mode is to be performed, the driving force reduction control is performed.

According to (3), when the vehicle is towing a heavy object and the transition to the second traveling mode is to be performed, the driving force reduction control is performed, and thus it is possible to effectively suppress a sudden drop in the driving force of the vehicle in a situation where a large driving force is required for the vehicle.

The invention claimed is:

1. A vehicle control device configured to control a vehicle, the vehicle including: an internal combustion engine; a generator that is driven by the internal combustion engine; an electric motor configured to perform driving by use of supply of electric power from the generator; a drive wheel that is driven by at least one of the internal combustion engine and the electric motor; and a connecting-disconnecting part configured to connect and disconnect a power transmission path between the internal combustion engine and the drive wheel,
wherein the vehicle is capable of traveling in a plurality of traveling modes including
a first traveling mode in which the power transmission path is connected by the connecting-disconnecting part and at least the internal combustion engine drives the drive wheel to cause the vehicle to travel, and
a second traveling mode in which the power transmission path is disconnected by the connecting-disconnecting part and the electric motor drives the drive wheel by use of supply of electric power from at least the generator to cause the vehicle to travel, and
wherein the vehicle control device
is capable of deriving a required driving force required for traveling of the vehicle based on an output requirement received from a driver, and controlling a driving force of the vehicle using the required driving force as a target value,
is configured to transition to the second traveling mode when the required driving force increases while the vehicle is traveling in the first traveling mode, and
is configured to perform driving force reduction control, in which an amount of increase in the required driving force accompanying an increase in the output requirement is made smaller an amount of increase in the required driving force in a normal state, at a time of performing transition to the second traveling mode.

2. The vehicle control device according to claim 1,
wherein when the vehicle is towing a heavy object and transition to the second traveling mode is to be performed, the driving force reduction control is performed.

3. A vehicle control device configured to a vehicle, the vehicle including: an internal combustion engine; a generator that is driven by the internal combustion engine; an electric motor configured to perform driving by use of supply of electric power from the generator; a drive wheel that is driven by at least one of the internal combustion engine and the electric motor; and a connecting-disconnecting part configured to connect and disconnect a power transmission path between the internal combustion engine and the drive wheel,
wherein the power transmission path includes a first power transmission path on a low speed side and a second power transmission path on a higher speed side than the first power transmission path,
wherein the connecting-disconnecting part includes a first connecting-disconnecting part configured to connect and disconnect the first power transmission path, and a second connecting-disconnecting part configured to connect and disconnect the second power transmission path,
wherein the vehicle is capable of traveling in a plurality of traveling modes including
a first traveling mode in which the first power transmission path is connected by the first connecting-disconnecting part, the second power transmission path is disconnected by the second connecting-disconnecting part, and at least the internal combustion engine drives the drive wheel via the first power transmission path to cause the vehicle to travel, and
a second traveling mode in which the first power transmission path is disconnected by the first connecting-disconnecting part, the second power transmission path is disconnected by the second connecting-disconnecting part, and the electric motor drives the drive wheel by use of supply of electric power from at least the generator to cause the vehicle to travel, and
wherein the vehicle control device
is capable of deriving a required driving force required for traveling of the vehicle based on an output requirement received from a driver, and controlling a driving force of the vehicle using the required driving force as a target value,
is configured to transition to the second traveling mode when the required driving force increases while the vehicle is traveling in the first traveling mode, and
is configured to perform driving force reduction control, in which an amount of increase in the required driving force accompanying an increase in the output requirement is made smaller than an amount of increase in the required driving force in a normal state, at a time of performing transition to the second traveling mode.

4. The vehicle control device according to claim 3,
wherein when the vehicle is towing a heavy object and transition to the second traveling mode is to be performed, the driving force reduction control is performed.

* * * * *